(12) United States Patent
Lachman

(10) Patent No.: US 11,223,776 B1
(45) Date of Patent: Jan. 11, 2022

(54) SYSTEMS AND METHODS FOR GENERATING AN EXPOSURE INFORMATION SIGNAL

(71) Applicant: Cinecam, Inc., Morristown, NJ (US)

(72) Inventor: Edward Lachman, New York, NY (US)

(73) Assignee: Cinecam, Inc., Morristown, NJ (US)

( * ) Notice: Subject to any disclaimer, the term of this patent is extended or adjusted under 35 U.S.C. 154(b) by 0 days.

(21) Appl. No.: 17/018,161

(22) Filed: Sep. 11, 2020

(51) Int. Cl.
 *H04N 5/235* (2006.01)

(52) U.S. Cl.
 CPC ................................ *H04N 5/2351* (2013.01)

(58) Field of Classification Search
 CPC .. H04N 5/2351; H04N 5/2352; H04N 5/2354; H04N 5/235; H04N 5/35572
 See application file for complete search history.

(56) References Cited

U.S. PATENT DOCUMENTS

| | | | | |
|---|---|---|---|---|
| 6,970,199 B2* | 11/2005 | Venturino | ........ | H04N 5/232945 348/333.02 |
| 2005/0134722 A1* | 6/2005 | Hofer | ................. | H04N 5/23293 348/364 |
| 2017/0359524 A1* | 12/2017 | Hosono | .................. | H04N 5/772 |
| 2018/0091719 A1* | 3/2018 | Wakisaka | ............. | H04N 5/2351 |
| 2019/0253623 A1* | 8/2019 | Lim | ..................... | H04N 5/2353 |

\* cited by examiner

*Primary Examiner* — Luong T Nguyen
(74) *Attorney, Agent, or Firm* — MTS Patents LLC

(57) ABSTRACT

In one embodiment, a camera which generates an exposure information image signal is provided. The camera may include an image sensor, a storage medium, and a processing component. The image sensor may be for creating an initial image signal. The storage medium may have gamma correction information stored therein. The processing component may be configured to at least receive the initial image signal, receive the gamma correction information, and generate an exposure information signal based at least in part on the initial image signal and the gamma correction information, where when the exposure information signal is displayed on a display device, the display device shows relative exposure values of portions of the initial image as modified by the gamma correction information.

20 Claims, 5 Drawing Sheets

SYSTEMS AND METHODS FOR GENERATING AN EXPOSURE INFORMATION SIGNAL

BRIEF SUMMARY OF THE INVENTION

In one embodiment, a camera which generates an exposure information image signal is provided. The camera may include an image sensor, a storage medium, and a processing component. The image sensor may be for creating an initial image signal. The storage medium may have gamma correction information stored therein. The processing component may be configured to at least receive the initial image signal, receive the gamma correction information, and generate an exposure information signal based at least in part on the initial image signal and the gamma correction information, where when the exposure information signal is displayed on a display device, the display device shows relative exposure values of portions of the initial image as modified by the gamma correction information.

In another embodiment, a method for generating an exposure information image signal is provided. The method may include receiving, with a processing component, an initial image signal generated by an image sensor of a camera. The method may also include receiving, with the processing component, gamma correction information from a storage medium of the camera. The method may further include generating, with the processing component, an exposure information signal based at least in part on the initial image signal and the gamma correction information, where when the exposure information signal is displayed on a display device, the display device shows relative exposure values of portions of the initial image as modified by the gamma correction information.

In another embodiment, a camera which generates an exposure information image signal is provided. The camera may include a first means, a second means, and a third means. The first means may be for creating an initial image signal. The first means may include an image sensor. The second means may be for storing gamma correction. The second means may include a storage medium. The third means may be for generating an exposure information signal based at least in part on the initial image signal and the gamma correction information. The third means may include a processing component.

BRIEF DESCRIPTION OF THE DRAWINGS

Embodiments of the present invention are described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability, or configurations of the disclosure. Rather, the ensuing description of the exemplary embodiments will provide those skilled in the art with an enabling description for implementing the exemplary embodiments and all other embodiments within the scope of the disclosure. It being understood that various changes may be made in the function and arrangement of elements disclosed herein without departing from the spirit and scope of the invention as set forth in the appended claims. For example, one of skill in the art, upon reading this disclosure may recognize that steps of described methods may be rearranged, or components of a described system may be reorganized.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to any embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without all of these specific details. Additionally, well-known processes, structures, techniques, and other elements may not be discussed in great detail in order to avoid obscuring the embodiments.

Certain existing patents and patent application publications may be related to this application, and/or may discuss background or deficiencies in the prior art, and are hereby incorporated by reference, for all purposes, as if fully set forth herein. These include U.S. Pat. Nos. 6,970,199, 7,336,288, 7,999,861, and 8,279,348; as well as U.S. Pat. App. Pub. Nos. 2002/0145667, 2004/0130625, and 2005/0134722.

Figure 1:
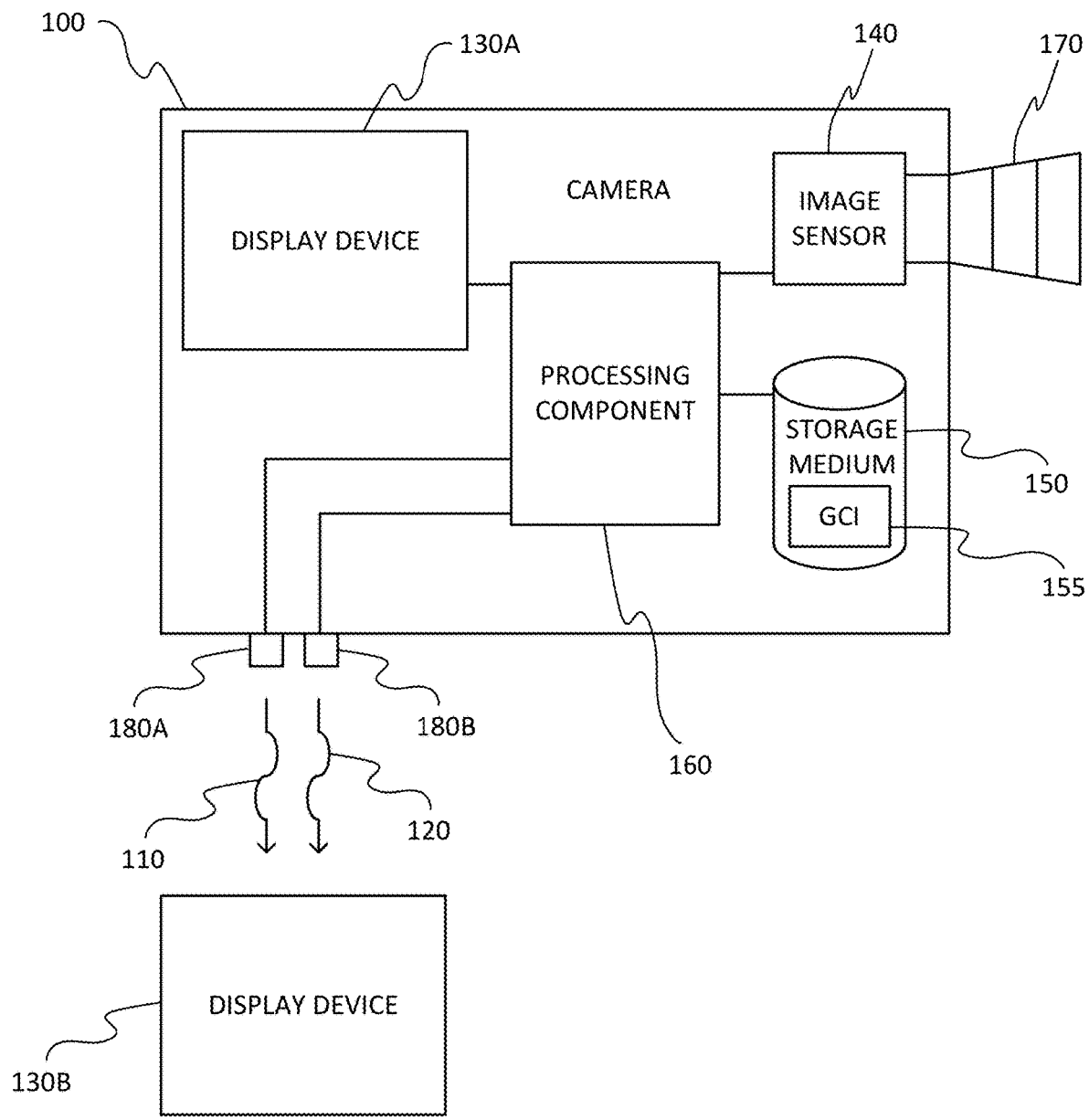
FIG. 1 shows one embodiment of the invention where a camera is provided that is capable of providing an output image signal as well as an exposure information signal, which corresponds to the output image signal.

FIG. 1 shows a schematic of one embodiment of the invention. In this embodiment, a camera 100 is disclosed which generates an output image signal 110 as well as an exposure information signal 120 which corresponds to output image signal 110. The images which output image signal 110 and exposure information signal 120 contain/represent may be output digitally and may represent still and/or moving images (motion pictures) when displayed on display devices 130A-B.

Figure 2:
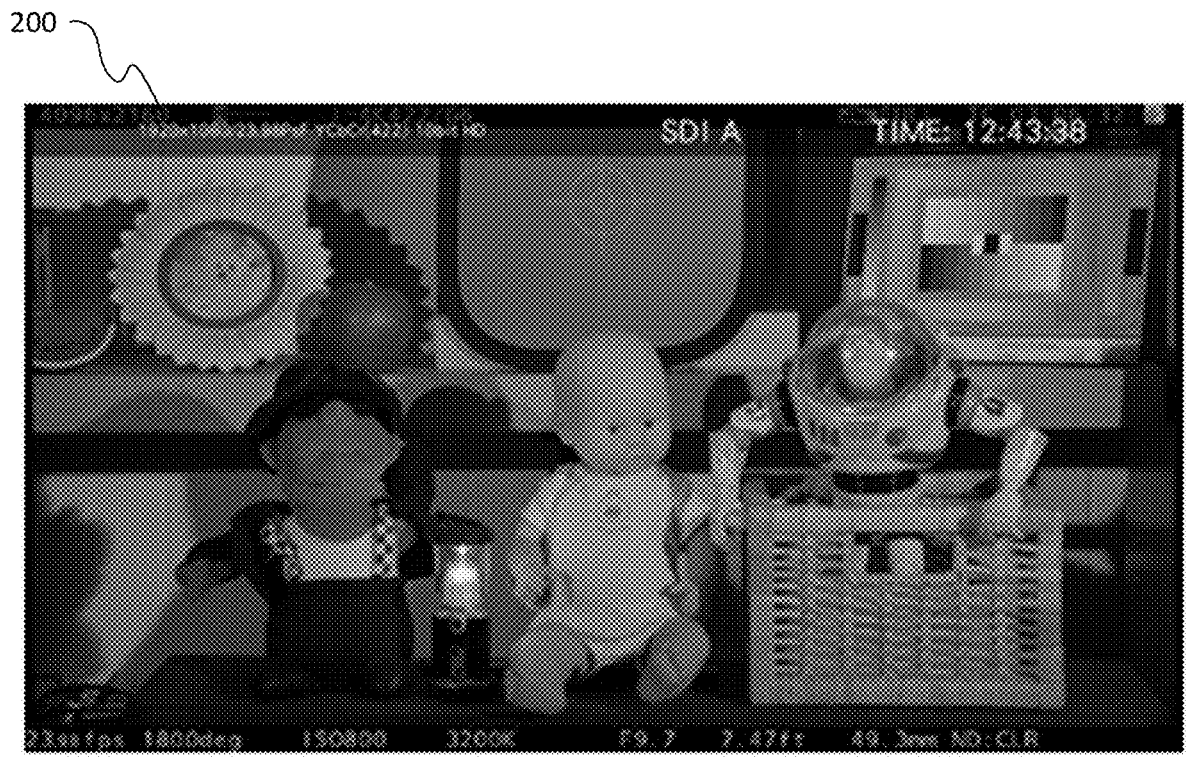
FIG. 2 is an example output image provided by the output image signal.
Figure 3:
FIG. 3 is an example output image provided by the exposure information signal, which corresponds to the output image of FIG. 2.

FIG. 2 shows an example image 200 when an example output image signal 110 is displayed on display device 130. FIG. 3 shows an example image 300 when exposure information signal 120 which corresponds to image 200 is displayed on display devices 130A-B. Image 300 of exposure information signal 120 shows a version of image 200 where the different regions of image 200 are shown as color coded regions which represent the exposure value of the particular region so identified. Those of skill in the art will understand that exposure values correspond to exposure 'stops' on a camera (such as camera 100), with each integer increase in exposure value, or 'stop,' representing 100% more light than the previous integer value, or 'stop.'

Figure 4:
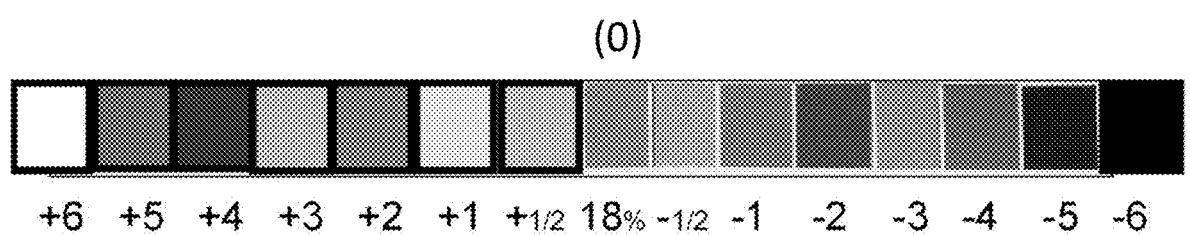
FIG. 4 is a legend for FIG. 3 which shows the colors associated with different exposure values in the example output image provided by the exposure information signal.

FIG. 4 is a legend for FIG. 3. that shows which colors in image 300 correspond to what exposure values. Regions of image 200 with an exposure value of +6 or more relative to 18% grey (middle grey) are shown in white. Regions of image 200 with an exposure value of +5 through +½ are shown in shades of yellow, orange, and red. Regions of image 200 with an exposure value of zero (18% grey; i.e., middle grey) are shown in grey. Regions of image 200 with an exposure value of −½ through −5 are shown in shades of green, blue, and purple. Regions of image 200 with an exposure value of −6 or less are shown in black.

Camera 100 may include an image sensor 140, a storage medium 150, and a processing component 160, as well as other mechanisms otherwise present in a camera such as lenses 170, circuitry, and other electro/mechanical components such as output interfaces 180A-B. In this embodiment, output interface 180A provides a digital output of output image signal 110, and output interface 180B is provided to provide a digital output of exposure information signal 120. In this embodiment, camera 100 is shown as having an integrated display device 130A, but a separate display device 130B may also be employed via output interfaces 180. In some embodiments, camera 100 may not include integrated display device 130A, but may for example include a viewfinder as is typical in the art.

Image sensor 140 may be for creating an initial image signal as received via lenses 170. Storage medium 150 may have gamma correction information (GCI) 155 stored therein. Camera 100 may be configured to apply GCI 155 to the initial image signal to produce output image signal 110. Those of skill in the art will understand GCI instructs camera 100 components how to modify the initial image signal in order to enhance the output image provided for viewing by human beings, which may perceive slight variations in dark tones differently than slight variations in bright tones.

Storage medium 150 may be any medium within camera 100 which stores data/information. For example, storage medium 150 may be any RAM, ROM, magnetic drive, solid-state medium, or other technology known in the art for storing data/information. In some embodiments, storage medium 150 may, in addition to storing GCI, also store data/information pertinent to an operating system of camera 100 (for example, firmware or other software related to image capture, image processing, and image output via output image signal 110). In some embodiments, storage medium 150 may be separate, and in addition to, any other storage mediums in camera 100 used for purposes besides generating exposure information signal 120 (such as image capture, image processing, and image output via output image signal 110).

Processing component 160 may be any central processing unit, field programmable gate array, programmable logic controller, or other like device known in the art for executing stored instructions. In some embodiments, processing component 160 may, in addition to generating exposure information signal 120, also execute stored instructions pertinent to the operating system of camera 100 (for example, to capture images, process images, and outputting output image signal 110). In some embodiments, processing component 160 may be separate, and in addition to, any other processing components in camera 100 used for purposes besides generating exposure information signal 120 (such as capturing images, processing images, and outputting output image signal 110).

Processing component 160 may be configured to receive the initial image signal from image sensor 140, receive GCI 155, and generate exposure information signal 120 based at least in part on the initial image signal and the gamma correction information. Processing component 160 analyzes each pixel or region of initial image, and in view of GCI 155, determines an exposure value for that pixel or region, thereby creating the corresponding exposure information signal 120. When exposure information signal 120 is displayed on display devices 130A-B, display devices 130A-B shows relative exposure values of portions of the initial image as would be modified by GCI 155.

In this manner, an operator of camera 100 may view the image of exposure information signal 120 and determine if areas of the image of output image signal 110 are over or under exposed, and know immediately from the color of a region in the image of the exposure information signal 120 how many stops the exposure of camera 100 needs to be adjusted by to change the exposure of the overall image by such amount.

Figure 5:
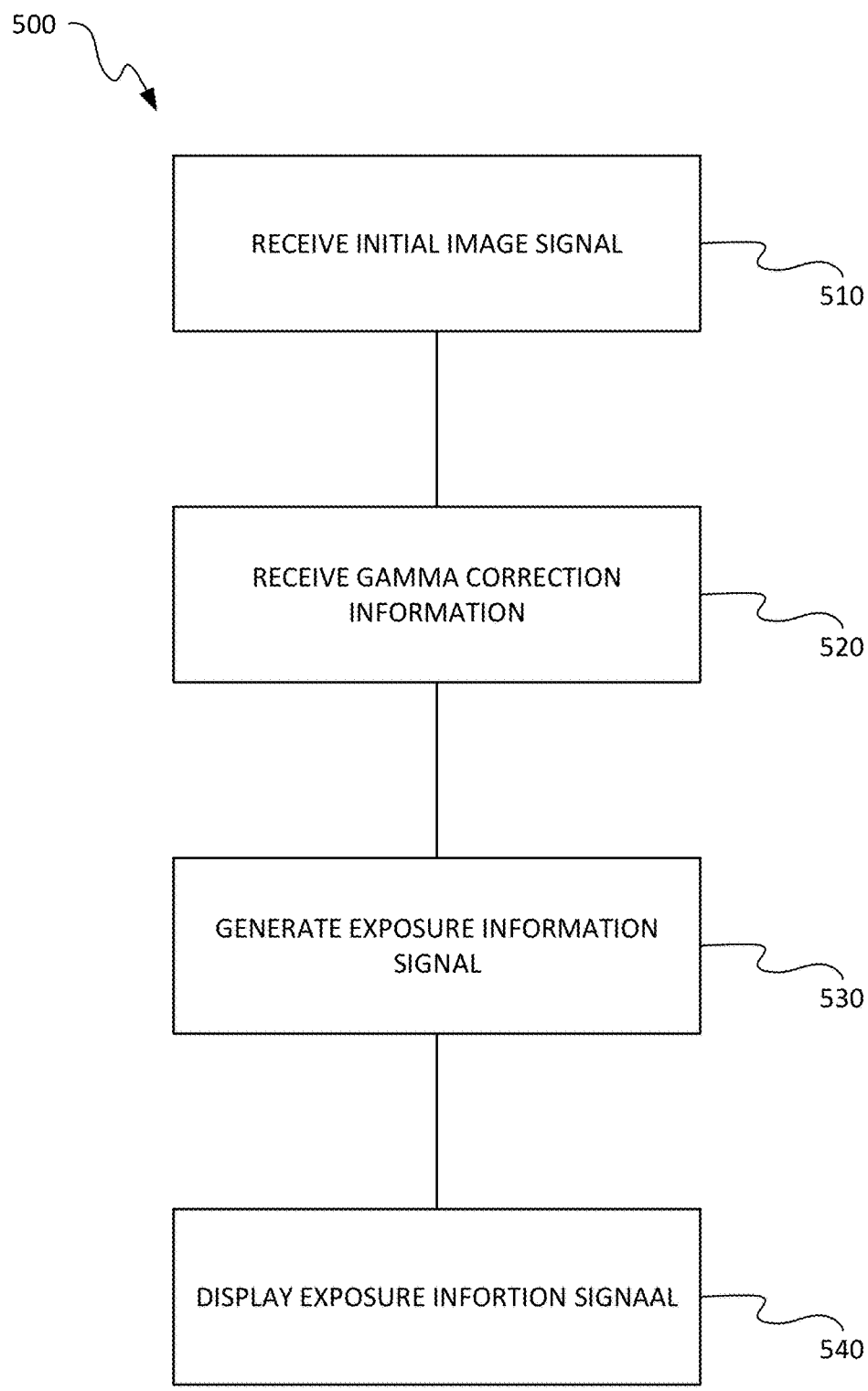
FIG. 5 is a flow diagram of one embodiment of the invention where a method is provided capable of providing an output image signal as well as an exposure information signal, which corresponds to the output image signal.

FIG. 5 thus shows a block diagram of the exemplary method 500 of the invention described above. At step 510, processing component 160 receives an initial image signal from image sensor 140. At step 520, processing component 160 receives GCI from storage medium 150. At step 530, based on at least in part on initial image signal and GCI 155, exposure information signal 120 is generated and provided with output image signal 110 at output interfaces 180A-B.

Embodiments of the invention may be implemented automatically by electro/mechanical devices. Automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium (where typical machine-readable mediums are well known in the art). Processing component 160 may include a processor or other similar device and perform the necessary tasks.

The invention has now been described in detail for the purposes of clarity and understanding. However, it will be appreciated that certain changes and modifications may be practiced within the scope of the appended claims.

What is claimed is:

1. A camera which generates an exposure information image signal, wherein the camera comprises:
   an image sensor for creating an initial image signal;
   a storage medium having gamma correction information stored therein; and
   a processor configured to at least:
   receive the initial image signal;
   receive the gamma correction information; and
   generate an exposure information signal based at least in part on the initial image signal and the gamma correction information, wherein when the exposure information signal is displayed on a display device, the display device shows relative exposure values of portions of the initial image signal as modified by the gamma correction information.

2. The camera which generates the exposure information image signal of claim 1, wherein the camera further comprises:

the display device for displaying the exposure information signal.

3. The camera which generates the exposure information image signal of claim 1, wherein:
- the display device comprises a separate display device; and
- the camera further comprises an output interface for sending the exposure information signal to the separate display device.

4. The camera which generates the exposure information image signal of claim 1, wherein the display device showing the relative exposure values of portions of the initial image signal as modified by the gamma correction information comprises:
- showing portions of the initial image signal as modified by the gamma correction information in different colors, wherein each of the different colors represents a different relative exposure value.

5. The camera which generates the exposure information image signal of claim 4, wherein the different relative exposure value is selected from a group consisting of:
- +6, +5, +4, +3, +2, +1, +½, 0 (18% grey), −½, −1, −2, −3, −4, −5, and −6.

6. The camera which generates the exposure information image signal of claim 5, wherein the different relative exposure value is shown in an associated color as follows:
- +6 or more, white;
- +5 through +½, shades of yellow, orange, and red;
- 0 (18% grey), grey;
- −½ through −5, shades of green, blue, and purple; and
- −6 or less, black.

7. A method for generating an exposure information image signal, wherein the method comprises:
- receiving, with a processing component, an initial image signal generated by an image sensor of a camera,
- receiving, with the processing component, gamma correction information from a storage medium of the camera; and
- generating, with the processing component, an exposure information signal based at least in part on the initial image signal and the gamma correction information, wherein when the exposure information signal is displayed on a display device, the display device shows relative exposure values of portions of the initial image signal as modified by the gamma correction information.

8. The method for generating the exposure information image signal of claim 7, further comprising:
- displaying the exposure information signal on the display device of the camera.

9. The method for generating the exposure information image signal of claim 7, further comprising:
- displaying the exposure information signal on a separate display device from the camera via an output interface of the camera.

10. The method for generating the exposure information image signal of claim 7, wherein the display device showing the relative exposure values of portions of the initial image signal as modified by the gamma correction information comprises:
- showing portions of the initial image signal as modified by the gamma correction information in different colors, wherein each of the different colors represents a different relative exposure value.

11. The method for generating the exposure information image signal of claim 10, wherein the different relative exposure value is selected from a group consisting of:
- +6, +5, +4, +3, +2, +1, +½, 0 (18% grey), −½, −1, −2, −3, −4, −5, and −6.

12. The method for generating the exposure information image signal of claim 11, wherein the different relative exposure value is shown in an associated color as follows:
- +6 or more, white;
- +5 through +½, shades of yellow, orange, and red;
- 0 (18% grey), grey;
- −½ through −5, shades of green, blue, and purple; and
- −6 or less, black.

13. A camera which generates an exposure information image signal, wherein the camera comprises:
- a first means for creating an initial image signal;
- a second means for storing gamma correction; and
- a third means for generating an exposure information signal based at least in part on the initial image signal and the gamma correction information.

14. The camera which generates the exposure information signal of claim 13, wherein the first means comprises:
- an image sensor.

15. The camera which generates the exposure information signal of claim 13, wherein the second means comprises:
- a storage medium.

16. The camera which generates the exposure information signal of claim 13, wherein the third means comprises:
- a processing component.

17. The camera which generates the exposure information signal of claim 13, wherein the camera further comprises:
- a fourth means for displaying the exposure information signal.

18. The camera which generates the exposure information signal of claim 17, wherein the fourth means comprises:
- a display device.

19. The camera which generates the exposure information signal of claim 13, wherein the camera further comprises:
- a fourth means for sending the exposure information signal.

20. The camera which generates the exposure information signal of claim 19, wherein the fourth means comprises:
- an output interface.

* * * * *